United States Patent [19]

Alberts et al.

[11] 4,427,809

[45] Jan. 24, 1984

[54] THERMOPLASTIC MOULDING COMPOSITIONS OF CO-GRAFT POLYMERS

[75] Inventors: Heinrich Alberts, Cologne, Fed. Rep. of Germany; Winfried Fischer, Tokyo, Japan; Christian Leuschke, Dormagen, Fed. Rep. of Germany

[73] Assignee: Bayer Aktiengesellschaft, Leverkusen, Fed. Rep. of Germany

[21] Appl. No.: 330,085

[22] Filed: Dec. 14, 1981

[30] Foreign Application Priority Data

Dec. 23, 1980 [DE] Fed. Rep. of Germany ....... 3048697

[51] Int. Cl.$^3$ ..................... C08L 51/00; C08L 51/02; C08J 5/00; C08J 5/18
[52] U.S. Cl. .................................. 524/37; 525/54.21; 525/63; 525/88; 525/99; 525/165; 525/437; 525/445; 525/455; 527/301; 527/311; 527/312; 527/313; 527/314
[58] Field of Search ..................... 523/100; 525/54.21, 525/63, 66, 88, 95, 99, 165, 437, 445, 461, 468, 455, 941; 527/301, 311, 312, 313, 314; 524/37

[56] References Cited

U.S. PATENT DOCUMENTS

| | | | |
|---|---|---|---|
| 3,485,777 | 12/1969 | Gaylord | 527/314 |
| 3,632,677 | 1/1972 | Petner et al. | 260/878 R |
| 3,641,197 | 1/1972 | Holland et al. | 525/66 |
| 4,026,849 | 5/1977 | Bagley et al. | 527/314 |
| 4,160,758 | 7/1979 | Gardener | 260/40 R |
| 4,172,103 | 10/1979 | Serini et al. | 525/165 |
| 4,317,890 | 3/1982 | Goyert et al. | 525/66 |

FOREIGN PATENT DOCUMENTS

| | | |
|---|---|---|
| 9695 | 4/1980 | European Pat. Off. . |
| 2542613 | 4/1976 | Fed. Rep. of Germany . |
| 2305464 | 10/1976 | France . |

*Primary Examiner*—Lorenzo B. Hayes
*Assistant Examiner*—Nathan M. Nutter
*Attorney, Agent, or Firm*—Connolly and Hutz

[57] ABSTRACT

Thermoplastic moulding compositions of co-graft polymers which are obtained by the polymerization of vinyl monomers, in particular by the polymerization of unsaturated esters, in the presence of mixtures consisting of the following:
1. elastomers having glass transition temperatures $\leq 0°$ C.,
2. polyesters, polyethers, polyesterurethanes, polyurethanes, polycarbonates or mixtures thereof, and optionally
3. cellulose esters of aliphatic $C_1$–$C_5$ carboxylic acids, and moulding compositions consisting of mixtures of these co-graft polymers with organic cellulose esters.

1 Claim, No Drawings

THERMOPLASTIC MOULDING COMPOSITIONS OF CO-GRAFT POLYMERS

This invention relates to thermoplastic moulding compositions of co-graft polymers which are obtained by the polymerisation of vinyl monomers, in particular by the polymerisation of unsaturated esters, in the presence of mixtures consisting of the following:
1. elastomers having glass transition temperatures $\leq 0°$ C.,
2. polyesters, polyethers, polyesterurethanes, polyurethanes, polycarbonates or mixtures thereof, and optionally
3. cellulose esters of aliphatic $C_1$–$C_5$ carboxylic acids, and moulding compositions consisting of mixtures of these co-graft polymers with organic cellulose esters.

Moulding compositions consisting of cellulose acetate cannot be processed thermoplastically without the addition of low-molecular-weight plasticizers, because this ester starts to decompose before softening. The softening and decomposition temperatures of cellulose acetopropionates and cellulose acetobutyrates are so close together that these moulding compositions also have to be mixed with plasticizers before the thermoplastic processing thereof. As a result of this measure, the necessary reduction in the processing temperature and processing viscosity is achieved.

Aliphatic esters of phthalic acid, adipic acid, azelaic acid, sebacic acid and phosphoric acid, for example dimethyl phthalate, diethyl phthalate, dibutyl adipate, dioctyl adipate, dibutyl azelate, trichloroethyl phosphate and tributyl phosphate, are mainly used as plasticizers for organic cellulose esters. It is often advantageous to use mixtures of plasticizers.

It is also known (see, for example, U.S. Pat. Nos. 2,686,805; 2,815,354 and 3,051,667 and French Pat. No. 1,070,351) that polyesters of aliphatic or aromatic dicarboxylic acids may be mixed with organic cellulose esters. The resulting moulding compositions are generally very transparent, because of the good compatibility of the components, but they have the disadvantage of a drastic reduction in the dimensional stability under heat and in the hardness and flexural resistance, where there is an increasing quantity of polyester in the mixture. Furthermore, there is no improvement in the notched impact strength with an increasing polyester content and the impact resistances are inadequate at low temperatures.

Although cellulose ester moulding compositions which are modified with plasticizers and higher-molecular-weight polyesters have a very good transparency, it would be desirable for some purposes of use to improve, for example, the dimensional stability under heat and the hardness thereof. Moreover, the plasticizers migrate with time to the surface of the mouldings, so that, for example, films made of modified cellulose esters cannot be used to pack certain foodstuffs.

Mixtures of organic celllulose esters, low-molecular-weight plasticizers and olefin polymers are known from German Auslegeschrift No. 1,303,219. However, moulding compositions of this type are no longer transparent where there is a higher content of olefin polymers. Conventional low-molecular-weight esters which have the known disadvantages are also used in this case as plasticizers.

The use of polymeric plasticizers for cellulose mixed esters is also known. U.S. Pat. No. 3,682,850 describes thermoplastic mixtures consisting of from 40 to 90% by weight of cellulose esters and from 10 to 60% by weight of an ethylene-vinyl acetate copolymer, containing from 75 to 99% by weight of vinyl acetate, which are characterised by good mechanical strength properties and a high transparency.

Ethylene-vinyl acetate copolymers which have more than 75% by weight of vinyl acetate incorporated therein have glass transition temperatures $T_G \geq +10°$ C., i.e. elastification of the cellulose ester mixtures is not expected in systems of this type at low temperatures (from 0° C. to $-50°$ C.).

It has now been found that the above-mentioned disadvantages are overcome and that highly-transparent, soft and flexible or rigid and strong moulding compositions are obtained when vinyl monomers, preferably vinyl esters or (meth)acrylic acid-$C_1$–$C_{18}$ alkyl esters or mixtures thereof are grafted on mixtures consisting of the following:
1. elastomers having glass transition temperatures of $\leq 0°$ C., and
2. polyesters, polyesterurethanes, polyethers polyetherurethanes and polycarbonates or mixtures thereof, and optionally
3. cellulose esters of aliphatic $C_1$–$C_5$ carboxylic acids, as the graft substrate.

As a result of grafting, the polymeric components of the graft substrate are simultaneously completely or partly bridged together. Furthermore, it has been found that mixtures consisting of these co-graft polymers and organic cellulose esters exhibit an excellent compatibility and very good mechanical strength properties.

Thus, the present invention provides thermoplastic moulding compositions, consisting of the following:
(1) from 1 to 99, preferably from 15 to 95% by weight of a graft substrate which is composed of the following:
  (a) from 1 to 99.5, preferably from 50 to 97% by weight of an elastomer having a glass transition temperature $\leq 0°$ C.,
  (b) from 0.5 to 99, preferably from 3 to 50% by weight of one or more polyesters, polyethers, polyesterurethanes, polyetherurethanes, polycarbonates or mixtures thereof, and optionally
  (c) from 0 to 95, preferably from 0 to 45% by weight of a cellulose ester of one or more aliphatic $C_1$–$C_5$ carboxylic acids, and
(2) from 99-1, preferably from 5-85% by weight polymerized units of the following:
  (a) from 100–80% by weight of one or more vinyl esters and/or of one or more $C_1$–$C_{18}$ alkyl esters of acrylic acid and/or methacrylic acid, and
  (b) from 0 to 20% by weight of $C_2$–$C_4$-$\alpha$-olefins,
  at least some of the polymeric components of the graft substrate being bridged together by polymerised units of the graft monomers, and the total of components 1 and 2, (1a) to (1c) and (2a) and (2b) in each case being 100% by weight.

The present inventon also provides thermoplastic moulding compositions consisting of the following:
(I) from 1 to 99, preferably from 50 to 99% by weight of a cellulose ester of one or more aliphatic $C_1$–$C_5$ carboxylic acids, and
(II) from 99 to 1, preferably from 50 to 1% by weight of a co-graft polymer consisting of the following:
  (1) from 1 to 99, preferably from 15 to 95% by weight of a graft substrate composed of the following:

(a) from 1 to 99.5, preferably from 50 to 97% by weight of an elastomer having a glass transition temperature $\leq 0°$ C.,
(b) from 0.5 to 99, preferably from 3 to 50% by weight of one or more polyesters, polyethers, polyesterurethanes, polyetherurethanes, polycarbonates or mixtures thereof, and optionally
(c) from 0 to 95, preferably from 0 to 45% by weight of a cellulose ester of one or more aliphatic $C_1$–$C_5$ carboxylic acids, and
(2) from 99–1, preferably from 5–85% by weight polymerized units of the following:
(a) from 100 to 80% by weight of vinyl esters and/or $C_1$–$C_{18}$ alkyl esters of acrylic acid and/or methacrylic acid, and
(b) from 0 to 20% by weight of $C_2$–$C_4$-α-olefins, the total of components I and II, 1 and 2, (1a) to (1c) and (2a) and (2b) in each case being 100% by weight, and at least some of the polymeric components of the graft substrate being bridged together by polymerised units of the graft monomers.

Cellulose esters which are suitable for the preparation of the moulding compositions according to the present invention are cellulose esters of aliphatic carboxylic acids having from 1 to 5 carbon atoms, preferably cellulose acetate, cellulose acetopropionate and cellulose acetobutyrate.

Processes for the preparation of organic cellulose esters have been known for a long time and are described, for example, in Ullmanns Encyklopadie der technischen Chemie (Verlag Urban and Schwarzenberg, München-Berlin, 1963) in volume 5, on pages 182 to 201.

Cellulose acetobutyrates which are preferred contain the following:
from 40 to 50% by weight of butyric acid groups, and
from 15 to 26% by weight of acetic acid groups.

Cellulose acetobutyrates having the following composition are particularly preferred for the moulding compositions according to the invention:
from 42 to 46% by weight of butyric acid groups, and
from 18 to 22% by weight of acetic acid groups.

Cellulose acetopropionates which are preferred generally contain the following:
from 50 to 66% by weight of propionic acid groups, and
from 1 to 12% by weight of acetic acid groups
and particularly preferred cellulose acetopropionates are composed as follows:
from 54 to 66% by weight of propionic acid groups, and
from 4 to 9% by weight of acetic acid groups.

Of the cellulose acetates, secondary cellulose acetates are preferably used.

The relative viscosities ($\eta_{rel}$) of 2% by weight solutions in acetone of the aliphatic cellulose esters used are generally from 2.5 to 6.0 at 20° C., preferably from 3.5 to 5.0 [dl/g].

The cellulose esters used for the preparation of the co-graft polymers generally conform in their composition with the cellulose esters used for the preparation of the mixtures, but it is naturally also possible to use other cellulose esters for the mixtures than those contained in the co-graft polymers.

The known 1,3-butadiene-or isoprene homopolymers, copolymers or block polymers are suitable as elastomers which have glass transition temperatures $T_g$ $\leq 0°$ C. Copolymers of butadiene or isoprene with up to 30% by weight of styrene or with $C_2$–$C_6$-α-olefins, such as ethylene, propylene or isobutylene are mainly used. Furthermore, copolymers with methyl methacrylate or (meth)acrylonitrile are suitable. The olefin copolymers may have statistical or alternating compositions. Two or three block copolymers of styrene and butadiene or isoprene are particularly suitable as block copolymers.

Elastomers whose main chains do not contain any unsaturated C-C-bonds are preferred as elastomers having glass transition temperatures $T_g$ $\leq 0°$ C. Corresponding elastomers are ethylene copolymers with $C_3$–$C_8$-α-olefins, with vinyl esters, preferably vinyl acetate and vinyl propionate, with $C_1$–$C_{18}$ alkyl esters of acrylic acid and methacrylic acid or unsaturated organic vinyl fluorides, preferably tetrafluoroethylene or vinylidene fluoride, also homo or copolymers of $C_1$–$C_{18}$ alkyl esters of acrylic acid or methacrylic acid having up to 75% by weight of incorporated vinyl esters, and also high-molecular-weight elastomeric polyesters and polyethers or polyurethane elastomers.

The ethylene-vinyl ester copolymers are prepared according to the known processes of high or medium pressure synthesis in bulk, solution or emulsion.

Organic vinyl esters of saturated, aliphatic monocarboxylic acids optionally substituted by halogen and particularly substituted by chlorine, having from 1 to 18 carbon atoms or aromatic monocarboxylic acids having from 7 to 11 carbon atoms are included as vinyl esters. The following are mentioned: vinyl formate, vinyl acetate, vinyl propionate, vinyl chloropropionate, vinyl butyrate, vinyl isobutyrate, vinyl capronate, vinyl laurinate, vinyl miristinate, vinyl stearate, and vinyl benzoate. Vinyl acetate is preferred.

The ethylene-vinyl ester copolymers prepared according to the high pressure synthesis process generally have melting index values, according to DIN 53 735 at 190° C. and under a strain of 2.16 kp, of from 0.1 to 1,000, preferably from 1.0 to 10, in particular from 3.5 to 6. The intrinsic viscosities measured in tetralin at 120° C. are generally from 0.1 to 1.5 [dl/g]. The molecular weights determined according to the light scattering method are preferably from 2,000 to 1,000,000. The non-uniformity value U defind according to the relation $M_w/M_n - 1$ (G. Schulz, Z, phys. Chem. (B) 43 (1939) pages 25 to 34) ranges from 1 to 30. These copolymers are preferably soluble in hydrocarbons or alcohols.

The ethylene-vinyl ester copolymers prepared, for example, according to the process of solution or emulsion polymerisation and containing from 5 to 75% by weight of vinyl esters, preferably from 25 to 55% by weight of vinyl esters, have melting index values (190° C., 2.16 kp) which may be greater than 100 but the melting index range is preferably below 15, in particular from 0.5 to 5. The molecular weights measured by the light scattering method are preferably from 5,000 to 1,000,000. The non-uniformity U is preferably from 1 to 12. The copolymers are soluble in hydrocarbons and alcohols and preferably have intrinsic viscosities in toluene of from 0.5 to 2.5 [dl/g].

The graft base to be used according to the invention and based on (meth)acrylate copolymers is prepared according to methods known per se in conventional manner. The (meth)acrylate copolymers are crosslinked or uncross-linked and have glass transition temperatures of less than 0° C., preferably less than $-20°$ C., in particular less than $-30°$ C. The glass transition temperature of the (meth)acrylate polymers may be determined, for example, according to the DSC method (K. H. Illers, Makromol. Chemie 127 (1969), P. 1). (Meth)acrylic acid alkyl esters having from 1 to 18 carbon atoms, preferably from 4 to 8 carbon atoms, in the alkyl radical are included for the preparation of the polymers. Acrylic acid n-butyl ester and acrylic acid 2-ethylhexyl ester are mentioned in particular. The (meth)acrylates may be used singly or combined for the preparation of the (meth)acrylate polymers serving as the graft base. It is also possible to use copolymers with other vinyl monomers as the graft base instead of (meth)acrylate (co)polymers. Vinyl esters, vinyl ethers, vinyl halides and aromatic vinyl compounds are particularly suitable as vinyl monomers. The following are mentioned in particular: vinyl acetate, vinyl adipate, vinyl stearate as vinyl ester, $C_1$–$C_{18}$ alkyl-vinyl ether, in particular ethyl-, n-butyl- and 2-ethylhexyl vinyl ether, vinyl chloride, vinyl fluoride and vinylidene fluoride, styrene and α-methyl styrene. If required, copolymers with (meth)acrylonitrile and (meth)acrylic acid may also be used as the graft base. The copolymers of (meth)acrylates with $C_2$–$C_6$-α-olefins and dienes which may be obtained according to specific processes are also suitable. Ethylene is particularly suitable as α-olefin and butadiene and isoprene are used as dienes. The soluble copolymers are prepared in the solvents known per se, preferably in alcohols or they are prepared in bulk and the cross-linked copolymers are preferably prepared in emulsion.

In order to obtain cross-linked (meth)acrylate polymers, processes may be carried out which are described, for example, in German Patent No. 1,260,135 or in German Offenlegungsschrift No. 2,826,925.

For the production of the co-graft polymers, organic vinyl esters of saturated, aliphatic monocarboxylic acids optionally substituted by halogen, and particularly substituted by chlorine, having from 1 to 18 carbon atoms or aromatic monocarboxylic acids having from 7 to 11 carbon atoms are included as vinyl esters. The following are mentioned: vinyl formate, vinyl acetate, vinyl propionate, vinyl chloropropionate, vinyl butyrate, vinyl isobutyrate, vinyl capronate, vinyl laurinate, vinyl myristinate, vinyl stearate, vinyl benzoate, and preferably vinyl acetate.

The ethylene (meth)acrylate copolymers prepared according to the high pressure synthesis process have melting index values, according to DIN 53 735 at 190° C. and under a strain of 2.16 kp, of from 0.1 to 1,000, preferably from 1.0 to 20. The intrinsic viscosities, measured in tetralin at 120° C., are generally from 0.1 to 1.5 [dl/g]. The molecular weights determined by the light scattering method are preferably from 2,500 to 1,000,000. The non-uniformity U defined according to the relation $M_w/M_n - 1$ (G. Schulz, Z. phys. Chem. (B) 43 (1939) pages 25–34) ranges from 1 to 30. These copolymers are soluble in hydrocarbons, alcohols or esters.

The (meth)acrylic acid $C_1$–$C_{18}$ alkyl ester copolymers prepared, for example, according to the solution or emulsion polymerisation process have melting index values (190° C., 2.16 kp) which may be greater than 100, but the melting index range is preferably below 35. The molecular weights measured by light scattering are preferably from 4,000 to 1,000,000. The non-uniformity U is generally from 1 to 15. The copolymers are soluble in hydrocarbons, alcohols and esters and preferably have intrinsic viscosities of from 0.5 to 2.5 [dl/g] in toluene.

The aliphatic or mixed aliphatic-aromatic polyesters used for the co-graft polymerisation process are prepared in a manner known per se by esterification or transesterification reactions of mixtures consisting of aliphatic or aromatic dicarboxylic acids, the anhydrides thereof or esters and aliphatic dialcohols (see Ullmanns Enzyklopädie der technischen Chemie, volume 14, Urban and Schwarzenberg, Munich, 1963, P. 80 ff.).

The following are preferably used as dicarboxylic acids: adipic acid, sebacic acid, terephthalic acid, phthalic acid, isophthalic acid, maleic acid, fumaric acid and itaconic acid. The following are preferably used as polyhydric alcohols: ethylene glycol, propanediol-1,2 and -1,3, butanediol-1,3 and -1,4, hexanediol-1,6, 2,2-dimethylpropanediol-1,3 and polyether-alcohols which contain from 2 to 7 ether oxygen atoms in the molecule (see German Auslegeschrift No. 1,054,620).

Higher-functional carboxylic acids or alcohols are used for the preparation of branched polyesters; glycerine, 1,1,1-trimethylolpropane, hexanetriol and pentaerythritol are mentioned (see, for example, German Patent No. 1,105,160 and German Auslegeschrift No. 1,029,147). The molecular weights of the polyesters are generally from 800 to 10,000, but they may also be substantially higher; their -OH numbers are generally from 0.1 to 80 and their residual water contents are less than 0.1%. If required, specific high-molecular-weight polyesters having, for example, a narrow molecular weight distribution may also be used and they are obtained by polymerisation of lactones, for example β-propiolactone, γ-butyrolactone or ε-caprolactone, or the synthesis thereof takes place by the copolymerisation of epoxides with cyclic anhydrides (see K. Hamann, Makrom. Chem. 51 (1962) 53 and R. F. Fischer, J. Poly. Sci. 44 (1960) 155).

Within the context of the present invention, suitable polyesters also include polycarbonates or mixed ester polycarbonates which may be obtained by a transesterification reaction with, for example, diphenyl carbonates. Butylene glycol polycarbonate and hexane-diol-1,6-polycarbonate are mentioned as examples. Corresponding purely aliphatic polycarbonates may also be obtained by the ring-opening polymerisation of, for example, glycol carbonate or by copolymerisation of epoxides with carbon dioxides.

The aliphatic polyethers used for the co-graft polymerisation process usually have from 2 to 8, preferably from 2 to 3, hydroxyl groups and are prepared, for example, by self-polymerisation of epoxides, such as ethylene oxide, propylene oxide, butylene oxide, tetrahydrofuran, styrene oxide or epichlorohydrin, for example in the presence of $BF_3$ or by adding these epoxides, optionally in admixture or successively, to starting components having reactive hydrogen atoms such as alcohols or amines, water, ethylene glycol, propylene glycol-(1,3) or -(1,2), trimethylolpropane, 4,4'-dihydroxy glycol-(1,3) or -(1,2)-trimethylolpropane, 4,4'-dihydroxydiphenylpropane, aniline, ammonia, ethanolamine or ethylene diamine. Sucrose polyethers as described, for example, in German Auselegeschrift Nos. 1,176,358 and 1,064,938 are also included according to the present invention. Those polyethers are frequently preferred which have mainly primary OH groups (up to 90% by weight of primary OH groups, based on all the OH groups present in the polyether). Polyethers which are also modified by vinyl polymers, as produced, for example by the polymerisation of styrene and acrylonitrile in the presence of polyethers (U.S. Pat. Nos.

3,383,351; 3,304,273; 3,523,093 and 3,110,695; German Patent No. 1,152,536) are also suitable, as are polybutadienes which have OH groups.

Polythioethers are also suitable, of which the following are mentioned in particular; the auto-condensation products of thiodiglycol and/or the condensation products of thiodiglycol with other glycols, dicarboxylic acids, formaldehyde, amino carboxylic acids or amino alcohols. Depending on the co-components, the products are polythio mixed ethers, polythioether esters or polythioether ester amides.

The OH functions of the polyethers or polyesters used may be acylated before, during or after the preparation of the co-graft polymers or they may be urethanised by a reactin with mono-, di- or polyisocyanates. Acylation may take place using carboxylic acids, carboxylic acid halides or carboxylic acid anhydrides. Transesterification using carboxylic acid esters or carbonates is naturally also possible. Acylation is preferably carried out using acetic anhydrides. Urethanisation may be carried out in principle using the isocyanates known in the art. Isocyanates which are preferred are the following: phenyl isocyanate, cyclohexyl isocyanate, alkyl isocyanates, such as methyl, ethyl, propyl, isopropyl or butyl isocyanate, methoxymethyl isocyanate, 1,4-tolylene diisocyanate, 1,2-tolylene diisocyanate, hexamethylene diisocyanate and isophorone diisocyanate.

Vinyl esters and/or alkyl esters of (meth)acrylic acid are primarily used as monomers for the preparation of the co-graft polymers. The following are suitable: the $C_1$–$C_{14}$, preferably the $C_1$–$C_4$ alkyl esters of acrylic acid and/or methacrylic acid, such as methyl (meth)acrylate, n-butyl and isobutyl (meth)acrylate and 2-ethylhexyl (meth)acrylate.

Vinyl esters which are suitable are those vinyl esters of aliphatic or aromatic monocarboxylic acids, preferably vinyl acetate, already described above.

Further suitable monomers include $C_2$–$C_4$-$\alpha$-olefins, such as ethylene, propylene and isobutylene, and optionally acrylic acid and methacrylic acid.

If transparent graft copolymers are not required, aromatic vinyl compounds, such as styrene or $\alpha$-methyl styrene, may also be used, optionally in admixture with the (meth)acrylic esters.

The graft polymerisation process is carried out in solution or in bulk. The following are mentioned as solvents: hydrocarbons, such as benzene, toluene or xylene; alcohols, such as methanol, ethanol, propanol, isopropanol, n-butanol or tert.-butanol; chlorinated hydrocarbons, such as chlorobenzene, methylene chloride or tetrachloroethylene; esters, such as acetic acid methyl, ethyl or butyl ester; and glacial acetic acid, or mixtures thereof.

The graft substrates may be dissolved in known manner in the solvent system which has been selected. It is naturally possible to prepare the solution of one graft substrate initially and then to dissolve the second polymer therein or in any solvent miscible with the first solvent, and then to combine the two mixtures and use the homogeneous solution thus obtained for the graft reaction. The graft polymerisation process is preferably carried out in a homogeneous phase, but it may also be carried out in principle in a heterogeneous phase. It is also possible initially to prepare a homogeneous phase consisting of the graft substrate, vinyl monomers and optionally solvent, to disperse the solution in water, and then to carry out polymerisation, optionally after adding the catalyst. The polymerisation process may take place continuously or in batches.

The graft reaction may also be carried out with or without solvents in polymerisation screws, the solvent or the residual monomers being removed from the graft polymerisation mixture by evaporation in evaporator screws, thin layer evaporators or spray driers.

Polymerisation is carried out at temperatures of generally from $-20°$ to $+250°$ C., preferably from $+30°$ to $+180°$ C., and at pressures of from normal pressure to 300 bars, preferably up to 25 bars.

The polymerisation catalysts may be added to the polymerisation mixture before, during or after the dissolving or mixing procedure. The catalysts are preferably introduced into the reaction mixture with the monomers or separately from the monomers after the homogeneous graft substrate solution has been prepared.

The polymerisation catalysts are used as appropriate in a quantity of from 0.001 to 2% by weight, based on the total of graft substrate and graft monomers. These quantities may naturally be widely exceeded.

Per or azo compounds or highly-substituted ethane derivatives which supply radicals, for example benzpinacol, may be used as polymerisation catalysts. The following are examples: benzoyl peroxide, tert.-butyl perpivalate, lauroyl peroxide, tert.-butyl peroctoate, tert.-butyl perbenzoate, di-tert.butyl peroxide, tert.-butyl perisononanate, diisopropyl percarbonate, dicyclohexyl percarbonate, dicumyl peroxide, tert.-butyl perneodecanoate, azobis-isobutyric acid nitrile or esters of azobisisobutyric acid, for example the bisethyl esters thereof.

Initiator radicals may also be prepared using known redox systems or by means of UV radiation, actinic light or accelerated electrons. During the preparation of the co-graft polymers used for the mixtures, the monomers used are grafted onto the cellulose esters and onto the ethylene-vinyl ester copolymer, with the formation of co-graft polymers which are cross-bridged by polymerised units of the monomers. This cross-bridging is dectectable by polymer-analytical experiments on the graft polymers.

This novel cross-bonding of the starting polymers which tend to segregate per se explains the extremely good compatibility established between the co-graft polymers and the organic cellulose esters.

The mixtures may be prepared according to known processes using a solution and processing the solution by precipitation and drying or by evaporating the solvent in evaporator screws, thin layer evaporators, evaporator coils or spray driers. The mixtures may also be prepared in the melt on a roller, in screw extruders or in kneaders.

The moulding compositions according to the present invention may optionally be further modified using low-molecular-weight plasticizers.

Low-molecular-weight plasticizers which are suitable are the following: dimethyl phthalate, diethyl phthalate, triphenyl phosphate, methyl ethylene glycol phthalate, di-n-butyl sebacate, ethyl butylene glycol phthalate, butyl-butylene glycol phthalate, dibutyl phthalate, dioctyl adipate, dioctyl phthalate, butyl benzyl phthalate and triacetin.

The moulding compositions according to the present invention may also contain additives, for example to dye the polymer mixtures, to pigment them, to improve the oxidation- or light-resistance thereof or to reduce the inflammability thereof.

The moulding compositions according to the invention consisting of the co-graft polymers and organic cellulose esters show an appreciable increase in the notched impact strength, measured according to DIN 53 453. They are also distinguished by an improved dimensional stability under heat which is measured, for example, according to DIN 53 460 as the Vicat softening temperature. The Vicat softening temperatures are up to 50° C. above the softening temperatures of the cellulose esters modified using low-molecular-weight plasticizers.

Compared to these conventional cellulose ester moulding compositions, the moulding compositions according to the present invention also show improved mechanical characteristics, such as an increase in hardness, in tensile strength, in the flexural resistance and in the elasticity modulus.

The know effect of so-called plasticizer seepage does not occur in mixtures consisting of organic cellulose esters and the co-graft polymers, so that such moulding compositions are also particularly well suited, for example, for uses in contact with foodstuffs.

The polymer mixtures according to the invention may be easily processed continuously and in batches on known extruders and injection moulding machines as they exhibit a good flowability during processing.

Mouldings of any type may be produced as well as acetate silk, block acetate, film substrates for acetate films, electro insulation films and lacquers.

The improved hot air and ageing resistance of the products also enables them to be used externally.

The following Examples illustrate the invention. The percentages all relate to weight.

The ethylene-vinyl acetate copolymers (EVA) used in the following Examples contains 45% by weight of incorporated vinyl acetate and has an intrinsic viscosity $\eta$ of 1.4 [dl/g].

The polyester 1 used in the Examples is a condensation product of adipic acid and diethylene glycol having an OH number of 55 and an acid number <1.

Polyester 2 is a condensation product from adipic acid, ethylene glycol and butylene glycol having an OH number of 38 and an acid number <1. Polyester 3 is a condensation product from adipic acid, isophthalic acid, neopentyl glycol and ethylene glycol having an OH number of 100 and an acid number of 25.

Polyester 1 is a polyethylene glycol having a molecular weight of 20,000.

The abbreviations in the Examples have the following meanings:
CB=cellulose acetobutyrate containing 45% of butyric acid groups and 19% of acetic acid groups.
CP=cellulose acetopropionate containing 57.5% of propionic acid groups and 5.5% of acetic acid groups.

PREPARATION OF THE CO-GRAFT POLYMERS

EXAMPLE 1

4,000 g of an ethylene-vinyl acetate copolymer (EVA) containing 45% by weight of incorporated vinyl acetate and having a Mooney viscosity of 20; 500 g of a cellulose acetopropionate, containing 57.5% by weight of propionic acid groups and 5.5% by weight of acetic acid groups; 500 g of the aliphatic polyester 1 of adipic acid and diethylene glycol, having an OH number of 55 and an acid number <1; 1,500 g of vinyl acetate; and 13,500 g of tert. butanol are introduced under a nitrogen atmosphere into a 40 liter autoclave which is provided with an anchor mixer and means for introducing different solvents, the internal temperature of which is to be exactly controlled using a heating/cooling jacket system. The contents of the autoclave are heated to 110° C. and are stirred for 1 hour at this temperature. A solution consisting of 3,000 g of vinyl acetate, 22 g of dibenzoyl peroxide and 4,000 g of tert. butanol is then added over a period of 3 hours. The mixture is then stirred for a further 3 hours at 110° C. After mixing with 500 g of a 5% solution of 2,6-di-tert.-butyl-p-cresol, the mixture is worked up using an evaporator screw. The resulting product has an intrinsic viscosity $[\eta]$ of 1.15 [dl/g]. The sample is composed as follows: 42% by weight of EVA, 5.5% by weight of cellulose acetopropionate, 5.5% by weight of polyester and 47% by weight of polymerised units of vinyl acetate.

A pressed plate produced from the graft product at 170° C. and 200 bars pressing power is completely colourless and highly transparent and does not exhibit any white fractures under elongation stresses.

The co-graft polymers of the following composition, as specified in Table 1, are prepared according to the process described in Example A:

TABLE 1

| Example | EVA [%] | CB [%] | CP [%] | Vinyl acetate [%] | Polyester [%] 1 | Polyester [%] 2 | Polyester [%] 3 | Polyether [%] 1 |
|---|---|---|---|---|---|---|---|---|
| 2 | 35.5 | 11.8 | — | 47.4 | 5.3 | — | — | — |
| 3 | 44 | 14.5 | — | 40.2 | 1.3 | — | — | — |
| 4 | 37.9 | — | 12.6 | 43.9 | 5.6 | — | — | — |
| 5 | 40 | — | 10 | 45 | 5 | — | — | — |
| 6 | 40 | 10 | — | 45 | 5 | — | — | — |
| 7 | 40 | — | — | 45 | 15 | — | — | — |
| 8 | 40 | — | — | 45 | — | 15 | — | — |
| 9 | 40 | — | — | 45 | — | — | — | 15 |
| 10 | 40 | — | — | 45 | — | — | 15 | — |

EXAMPLE 11

4,000 g of EVA, 500 g of CP, 500 g of polyester 1 and 50 g of hexamethylene diisocyanate, 1500 g of vinyl acetate and 13,500 g of tert. butanol are introduced into a 40-liter stirring autoclave. The autoclave is flushed free of air and is heated to 110° C. The mixture is stirred for 1 hour at an internal reactor temperature of 110° C. A solution 1 is then pumped in over a period of 3 hours. Solution 1: 4,000 g of tert. butanol, 3,000 g of vinyl acetate and 16.5 g of benzoyl peroxide. The mixture is then stirred for 3 hours at 110° C. It is mixed with a solution 2 consisting of 18 g of 2,6-di-tert.-butyl-p-cresol and 9 g of Lekutherm X 20 in 1,000 ml of toluene and is processed using an evaporator screw. The resulting graft polymer is composed as follows: 44% of EVA, 5.5% of CP, 44.5% of polymerised units of vinyl acetate and 6% of polyester urethane. The intrinsic viscosity $[\eta]$ is 1.48 [dl/g] in tetrahydrofuran at 25° C. A pressed plate produced at a pressing temperature of 170° C. and under a pressing power of 200 bars is highly transparent and flexible and does not show any white fracture upon bending or in a tension test.

EXAMPLE 12

A solution of 675 g of EVA, 170 g of polyester 1, 20 g of hexamethyl diisocyanate, 253 g of vinyl acetate, and 340 g of CP in 2275 g of tert. butanol is heated to 80° C. in an 8-liter stirring vessel. A solution of 506 g of vinyl acetate, 675 g of tert. butanol and 3.75 g of tert.

butyl perpivalate is then added over a period of 2 hours. The mixture is then stirred for 3 hours at 80° C. and the reaction product is isolated by precipitating with water, stripping the volatile portions with steam, filtration and drying. The product is composed as follows: 35% of EVA, 18% of CB, 10% of polyester urethane and 37% of polymerised units of vinyl acetate.

PREPARATION OF THE MOULDING COMPOSITIONS

EXAMPLES 13 TO 25

Cellulose acetobutyrate containing 45% of butyric acid groups and 19% of acetic acid groups is mixed vigorously with the quantities of the co-graft polymers specified in Table 2, on a roller at 170° C., the total of both components being 100%.

The rolled sheets are granulated and are then injected to form test bodies on an injection moulding machine at a mass temperature of 230° C. The references found in Tables 2 and 3 have the following meanings:

$a_n$ = impact resistance according to DIN 53 453 in kJ/m$^2$ $a_k$ = notched impact strength according to DIN 53 453 in kJ/m$^2$ Vicat = softening temperature in °C. according to DIN 53 460, process B, force 49.05 NJ $H_k^{30}$ = indentation hardness after 30 seconds according to DIN 53 456 in N/mm$^2$.

TABLE 2

| Example | Co-graft polymer | [%]$^a$ | $a_n$ Room temperature | −40° C. | $a_k$ | Vicat [°C.] | $H_K^{30}$ |
|---|---|---|---|---|---|---|---|
| 13 | 1 | 5 | 100 Unb. | 90 | 3.5 | 109 | 76.1 |
| 14 | 1 | 10 | Unb.$^b$ | 110 | 5 | 105 | 71.6 |
| 15 | 2 | 10 | 100 Unb. | 90 | 4 | 104 | 72.2 |
| 16 | 3 | 10 | 90 Unb. | 75 | 3.5 | 104 | 72.8 |
| 17 | 4 | 10 | 95 | 82 | 3.6 | 107 | 72.9 |
| 18 | 5 | 10 | Unb. | 60 | 6.1 | 99 | 67.2 |
| 19 | 6 | 10 | Unb. | 80 | 6.3 | 98 | 66.6 |
| 20 | 7 | 10 | 89 | 59 | 3.0 | 107 | 71.9 |
| 21 | 8 | 10 | 91 | 68 | 3.9 | 107 | 72.2 |
| 22 | 9 | 10 | 90 | 85 | 3.7 | 106 | 71.0 |
| 23 | 10 | 10 | 80 Unb. | 75 | 3.6 | 105 | 71.7 |
| 24 | 11 | 10 | Unb. | 80 Unb. | 5.0 | 96 | 65.2 |
| 25 | 12 | 10 | Unb. | 80 Unb. | 5.7 | 99 | 67.2 |

$^a$based on the polymer mixture
$^b$Unbroken

EXAMPLES 26 TO 36

Cellulose acetopropionate containing 57.5% of propionic acid groups and 5.5% of acetic acid groups is mixed vigorously with the quantities of the co-graft polymers specified in Table 3 on a roller at 170° C., the total of the components amounting to 100%.

The rolled sheets are granulated and are then injected to form test bodies on an injection moulding machine at a mass temperature of 230° C.

TABLE 3

| Example | Co-graft polymer | [%]$^a$ | $a_n$ Room temperature | −40° C. | $a_k$ | Vicat [°C.] | $H_K^{30}$ |
|---|---|---|---|---|---|---|---|
| 26 | 1 | 5 | 86 | 80 | 3.0 | 126 | 88.5 |
| 27 | 1 | 10 | Unb.$^b$ | 97 | 4.7 | 124 | 82.9 |
| 28 | 2 | 10 | 100 Unb. | 75 | 3.6 | 119 | 83.9 |
| 29 | 3 | 10 | 85 | 75 | 3.6 | 119 | 84.8 |
| 30 | 4 | 10 | 90 Unb. | 86 | 4.2 | 119 | 84.0 |
| 31 | 5 | 10 | 105 Unb. | 88 | 3.7 | 119 | 84.9 |
| 32 | 6 | 10 | 105 Unb. | 103 | 4.2 | 116 | 83.4 |
| 33 | 7 | 10 | 86 | 55 | 3.2 | 119 | 82.1 |
| 34 | 9 | 10 | 85 | 58 | 3.4 | 118 | 80.6 |
| 35 | 11 | 10 | 100 Unb. | 95 | 3.8 | 117 | 82.3 |
| 36 | 12 | 10 | Unb. | 120 | 4.2 | 118 | 84.6 |

$^a$based on the polymer mixture
$^b$Unbroken

EXAMPLES 37 TO 41

For the following mixtures, a co-graft polymer 37 is prepared by modifying the method of Example 1. The modification consists in the fact that the polyester 1 is not used for the synthesis of the co-graft polymer, although the other details of the formulation are retained. A co-graft polymer 37 is obtained and is composed as follows: 44.5% of EVA, 5.5% of CP and 50% of polymerised units of vinyl acetate.

According to the method which is specified for Examples 13 to 25, mixtures of the co-graft polymer 37, cellulose acetobutyrate and polyester 1 are prepared, the total of the components amounting to 100%.

TABLE 4

| Example | co-graft polymer 37 | CB | Polyester 1 | $a_n$ R.T. | −40° C. | $a_k$ | Vicat [°C.] | $K_H^{30}$ |
|---|---|---|---|---|---|---|---|---|
| 38 | 10 parts | 90 parts | — | Unb.$^a$ | 95 | 9.4 | 105 | 70.0 |
| 39 | Mixture as in Example 38 | | 0.5 parts | Unb. | 81 | 6.3 | 96 | 66.3 |
| 40 | | | 1.0 parts | Unb. | 85 | 8.1 | 96 | 65.1 |
| 41 | | | 2.5 parts | Unb. | 93 | 8.4 | 90 | 64.2 |

$^a$Unbroken

COMPARATIVE EXAMPLES

Cellulose acetobutyrate containing 45% of butyric acid groups and 19% of acetic acid groups is mixed vigorously with the quantities of polyester 1 specified in Table 4 on a roller at 170° C., the total of both components amounting to 100%. The rolled sheets are granulated and are the injected to form test bodies on an injection moulding machine at a mass temperature of 230° C.

TABLE 5

| Comparative Example | CB | Polyester 1 | $a_n$ Room temperature | −40° C. | $a_k$ | Vicat °C. | $K^H30$ |
|---|---|---|---|---|---|---|---|
| 1 | 95 | 5 | Unb.$^a$ | 91 | 2.1 | 95 | 72.6 |
| 2 | 90 | 10 | Unb. | 47 | 1.9 | 84 | 62.1 |
| 3 | 85 | 15 | Unb. | 22 | 1.7 | 74 | 51.5 |

$^a$Unbroken

We claim:

1. Thermoplastic moulding compositions, consisting of the following:
   I. from 50 to 99% by weight of a cellulose ester of one or more aliphatic C$_1$-C$_5$ carboxylic acids, and II. from 50 to 1% by weight of a co-graft polymer consisting of the following:
  (1) from 15 to 95% by weight of a graft substrate composed of the following:
    (a) from 50 to 97% by weight of an elastomer having a glass transition temperature of $\leq 0°$ C., said elastomer being an ethylenevinyl acetate copolymer containing from 5 to 75% by weight of vinyl acetate
    (b) from 3 to 50% by weight of one or more polyesters, polyethers, poluesterurethanes, polyetherurethanes, polycarbonates or mixtures thereof, and
    (c) from 0 to 45% by weight of a cellulose ester of one or more aliphatic $C_1-C_5$ carboxylic acids, and
  (2) from 85 to 5% by weight of polymerized units of the following:
    (a) from 100 to 80% by weight of vinyl esters and/or $C_1-C_{18}$ alkyl esters of acrylic acid and/or methacrylic acid, and
    (b) from 0 to 20% by weight of $C_2-C_4$-$\alpha$-olefins, at least some of the polymeric components of the graft substrate being bridged together by polymerized units of the graft monomers, and the total of components I and II, 1 and 2, (1a) to (1c) and (2a) and (2b) in each case being 100% by weight.

* * * * *